United States Patent [19]
Rauchwerger

[11] Patent Number: 5,546,005
[45] Date of Patent: Aug. 13, 1996

[54] GUARDED CAPACITANCE PROBE AND RELATED MEASUREMENT CIRCUIT

[75] Inventor: George P. Rauchwerger, Sunnyvale, Calif.

[73] Assignee: Flowline Inc., Seal Beach, Calif.

[21] Appl. No.: 370,306

[22] Filed: Jan. 9, 1995

[51] Int. Cl.$^6$ .............................. G01R 27/26; G01F 23/26
[52] U.S. Cl. .................. 324/688; 324/664; 324/671; 324/689; 73/304 C; 340/620; 361/284
[58] Field of Search ..................... 324/663, 664, 324/671, 686, 687, 688, 689, 690; 73/290 R, 304 C; 340/620; 361/284

[56] References Cited

U.S. PATENT DOCUMENTS

| | | | |
|---|---|---|---|
| 2,852,937 | 9/1958 | Maze | 73/304 |
| 3,496,460 | 2/1970 | Martin | 324/61 |
| 3,710,244 | 1/1973 | Rauchwerger | 324/61 R |
| 3,771,548 | 11/1973 | Rauchwerger | 137/392 |
| 3,864,974 | 2/1975 | Rauchwerger | 73/304 C |
| 3,879,644 | 4/1975 | Maltby | 317/246 |
| 3,958,159 | 5/1976 | Rauchwerger | 317/246 |
| 4,025,846 | 5/1977 | Franz et al. | 324/61 |
| 4,064,753 | 12/1977 | Sun et al. | 73/304 |
| 4,347,741 | 9/1982 | Geiger | 73/304 |
| 4,383,445 | 5/1983 | Siegel et al. | 73/304 |
| 4,417,472 | 11/1983 | Tward | 361/284 X |
| 4,417,473 | 11/1983 | Tward et al. | 73/304 |
| 4,449,405 | 5/1984 | Franz et al. | 361/284 X |
| 4,483,463 | 11/1984 | Buschmann | 361/284 X |
| 4,499,766 | 2/1985 | Fathauer et al. | 73/304 |
| 4,515,015 | 5/1985 | Kuhlman | 73/304 |
| 4,683,418 | 7/1987 | Wagner et al. | 324/664 |
| 4,757,252 | 7/1988 | Maltby et al. | 324/687 |
| 4,903,530 | 2/1990 | Hull | 73/304 R |
| 5,042,299 | 8/1991 | Wells | 73/304 C |
| 5,083,460 | 1/1992 | Kumada et al. | 340/620 X |
| 5,337,353 | 8/1994 | Boie et al. | 324/660 X |

FOREIGN PATENT DOCUMENTS 1673841  4/1978  Germany .

*Primary Examiner*—Kenneth A. Wieder
*Assistant Examiner*—Glenn W. Brown
*Attorney, Agent, or Firm*—Pretty, Schroeder, Brueggemann & Clark

[57] ABSTRACT

A continuous liquid level measuring system having a guarded capacitance probe and related drive circuit for providing accurate level measurements, even when measuring the level of ionic and highly viscous fluids. The capacitance probe has two parallel electrodes, each constructed of a half-tube section, that are separated from each other by an insulated guard wire. The probe is excited by a 1 MHz excitation signal applied across the electrodes. The current through the electrodes is a function of the capacitance between the electrodes, which is affected by the relative permitivity of the surrounding liquid. The effects of highly viscous ionic liquids that adhere to the probe are reduced by exciting the guard wire with a guard signal that is 180° out of phase from the probe's excitation signal. The guard signal changes the electric field existing in the space adjacent the junctions of the two electrodes to reduce any liquid coating effects on the level measurement. The capacitance probe is connected to a capacitance measurement circuit through at least one 1:1 ratio pulse transformer for isolation, effectively eliminating the effects of noise currents on the probe's capacitance. Preferably, a second pulse transformer is provided to isolate the guard wire.

20 Claims, 4 Drawing Sheets

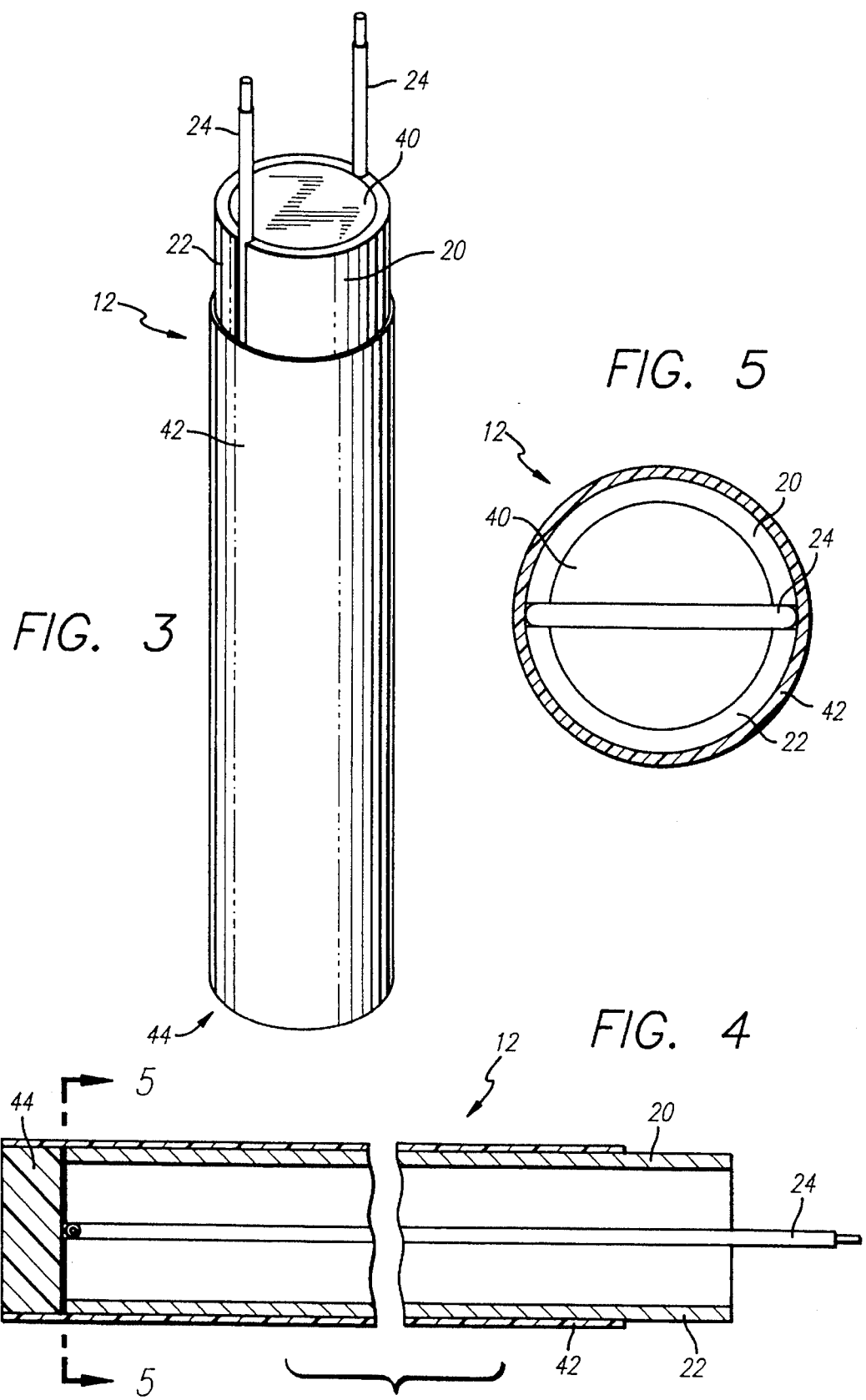

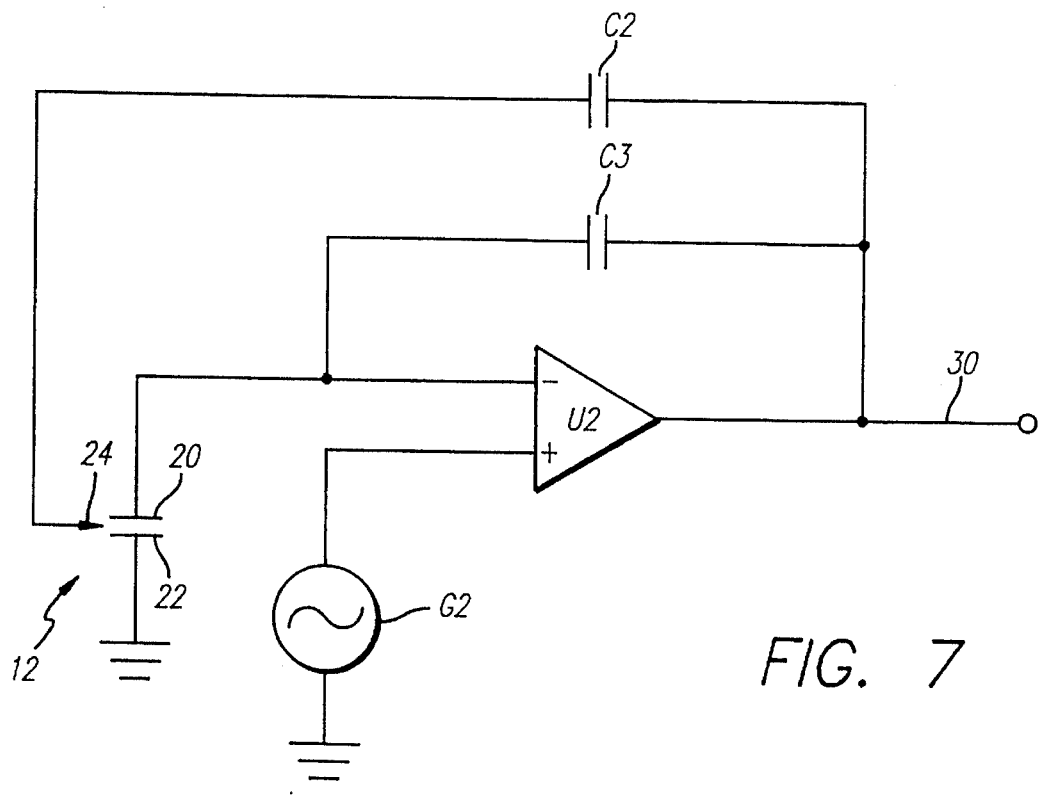
FIG. 7
FIG. 8
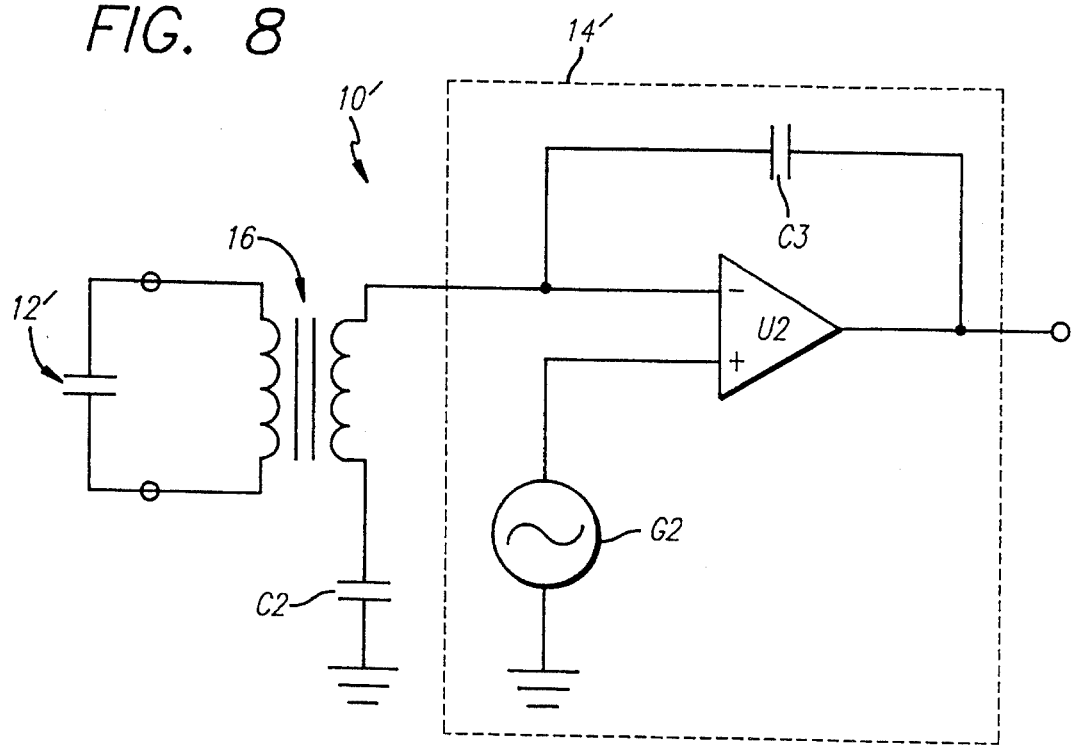

GUARDED CAPACITANCE PROBE AND RELATED MEASUREMENT CIRCUIT

BACKGROUND OF THE INVENTION

This invention relates generally to continuous fluid level measurement systems and, more particularly, to a continuous fluid level measuring system that has a capacitance probe for providing more reliable and accurate level measurements.

One common fluid level measuring system of this particular kind utilizes a capacitance probe having an electrode mounted within a grounded metal container that can be filled with a liquid or the like. The grounded container functions as a second electrode, spaced apart from the probe electrode, to form a capacitor. The capacitance of the probe varies with the container's shape, the location of the probe electrode in the container, and the dielectric constant of the insulating material between the probe electrode and the container. Since the dielectric constant for the liquid is typically much larger than the dielectric constant for air, the capacitance between the electrode and the container continuously changes as the liquid level changes, the liquid acting as a variable-thickness dielectric. The capacitance between the probe electrode and the container electrode thus can provide an indication of the liquid level in the container.

Another common continuous capacitance probe has two elongated insulated electrodes placed upright within a container. The capacitance between the two electrodes changes as the liquid level changes. Although insulated, such capacitance probes are directly connected to grounded measurement circuits, which are susceptible to ground currents induced on the probe or connecting wires.

The capacitance of these probes may be measured using the circuit shown in FIG. 1. The capacitance probe Cx is connected between the inverting input terminal (−) of an operational amplifier U1 and a ground terminal. An oscillator G1 is connected between the operational amplifier's noninverting input terminal (+) and the ground terminal. A feedback capacitor C1 is connected between the operational amplifier's output terminal and its inverting input terminal (−). A constant amplitude ac voltage signal Vs from the oscillator is applied between the noninverting input terminal and the ground terminal. As a result, the operational amplifier, through the feedback capacitor, forces the voltage at the inverting input terminal to track the voltage signal Vs at noninverting input terminal. This voltage at the inverting input terminal induces a probe current through the capacitance probe that is related to the probe's capacitance. At the output terminal, the amplifier sets an output voltage Vo to cause a feedback current, which is substantially equal to the probe current, to flow through the feedback capacitor. Thus, the amplifier's output voltage Vo is proportional to the probe's capacitance. Accordingly, as the liquid level increases, the capacitance of the probe increases, causing a corresponding increase in the amplitude of the output signal.

Generally, the accuracy of the continuous liquid level measuring system is limited by the resolution of the capacitance probe and related circuitry. However, when a capacitance probe is used with a highly ionic or viscous liquid, the liquid tends to coat the probe even at low levels, which can cause inaccurate measurements. Attempted solutions, such as covering the probe with Teflon, have not eliminated the coating problem. Other solutions for the coating problem, such as guard shields, have required a grounded container to act as one of the probe's electrodes, thereby preventing the use of an ungrounded probe and limiting the probe's geometry.

From the discussion above, it should be apparent that there is a need for a continuous liquid level measurement system having a totally isolated capacitance probe that is unaffected by either a viscous conductive liquid coating or an ungrounded container. Likewise, there is a need for a capacitance measurement circuit that provides a totally isolated connection to the isolated capacitance probe. The present invention satisfies these needs.

SUMMARY OF THE INVENTION

The present invention is embodied in a fluid level measurement system for continuously sensing a fluid's level within a container over a predetermined height range. The system includes an insulated capacitance probe having first and second spaced-apart electrodes mounted vertically within the container and an insulated guard element located between the electrodes. The electrodes and the guard element are insulated from each other and from the fluid and container. The guard element modifies the electric field surrounding the first and second electrodes so that the capacitance probe's accuracy is relatively unaffected by any coating that may adhere to the probe's surface.

Each electrode is a half-tube section having a capacitive area of a predetermined length and width such that the length of each electrode extends over the predetermined range. When an excitation signal is applied across the electrodes, an electric field is induced between and surrounding the electrodes. The guard element is an insulated wire that extends along the length of one side of the probe between a first set of adjacent edges of the two half-tube sections and that returns on an opposite side of the probe between a second set of adjacent edges of the two half-tube sections. When an electric signal is applied to the guard element, an electric field surrounding both the first and second electrodes is modified.

In a more detailed feature of the invention, the probe includes a dielectric core of low density plastic that substantially fills the space between the two half-tube sections, and a covering that completely insulates the probe from the fluid. A desirable covering would be a Teflon tube that covers the cylindrical probe with a plug that hermetically seals the end of the probe that extends into the fluid. Teflon has low surface adhesion and the fluid is less likely to coat the probe if it is coated with Teflon.

The measurement circuit has a drive terminal, a guard terminal, and an output terminal upon which the measurement circuit provides an excitation signal, a guard signal, and an output signal, respectively. The terminals of the measurement circuit are coupled to the probe such that the excitation signal is applied across the first and second electrodes, the guard signal is applied to the guard element, and the output signal is based on the fluid's effect on the electric field.

More specifically, the measurement circuit includes an operational amplifier, an oscillator, a feedback capacitor, and a guard capacitor. The inverting input terminal of the amplifier is coupled to the drive terminal and the amplifier's output terminal is coupled to the measurement circuit's output terminal. Also, the oscillator is connected to the noninverting input of the amplifier, the feedback capacitor is connected between the amplifier's inverting input and the measurement circuit's output terminal, and the guard capacitor is coupled between the guard terminal and the measurement circuit's output terminal. Further, a high-pass filter having a cutoff frequency above 60 Hertz (Hz) may be connected between the amplifier's output terminal and the measurement circuit's output terminal to remove power-line frequency noise from the output signal.

In another more detailed feature of the invention, the measurement system further includes first and second isolation transformers with each transformer having isolated primary and secondary windings and each winding having first and second winding terminals. The isolation transformers are connected between the measurement circuit and the probe such that the excitation signal and the guard signal are 180° out of phase with each other.

More specifically, the first isolation transformer has its primary winding coupled between the drive terminal and a ground terminal, and its secondary winding coupled to the probe such that its first and second secondary winding terminals are coupled to the first and second electrodes, respectively. Similarly, the second isolation transformer has its primary winding connected between the guard terminal and the ground terminal, and its secondary winding coupled to the probe such that its first secondary winding terminal is coupled to the guard element and its second secondary winding terminal is connected to the second terminal of the first secondary winding.

In yet another more detailed feature of the invention, the measurement system includes a triaxial cable having an outer shield, an inner shield and a center conductor. The triaxial cable is coupled between the capacitance probe and the measurement circuit and allows the capacitance probe to be remotely located from the measurement circuit. More specifically, the outer shield is connected between the second electrode and the second secondary winding terminal of the first isolated transformer, the inner shield is connected between the guard element and the first secondary winding terminal of the second isolation transformer, and the center conductor is connected between the first electrode and the first secondary winding terminal of the first isolation transformer.

In another embodiment, the present invention resides in an isolated circuit that measures the capacitance of a capacitance probe. The circuit includes an excitation circuit and an isolation transformer. The excitation circuit provides at a drive terminal, an excitation signal with respect to ground for exciting the capacitance probe. Also, the excitation circuit provides at an output terminal, an output signal based on the capacitance probe's effect on the excitation signal. The isolation transformer has isolated primary and secondary windings. The primary winding is coupled between the drive terminal and a ground terminal and the secondary winding is coupled across the capacitance probe. The isolation transformer prevents dc and common-mode ac noise from reaching the excitation circuit.

The isolated circuit can include many of the detailed features discussed above with respect to the previous embodiment. For example, the capacitance probe may include a guard element, etc., and the excitation circuit may include the measurement circuit's detailed features discussed above. Likewise, the isolated circuit can further include a second isolation transformer, triaxial cable, etc.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 3 is a perspective view of an embodiment of the guarded capacitance probe of the present invention.

FIG. 4 is side sectional view of the guarded capacitance probe shown in FIG. 3.

FIG. 5 is a sectional view of the guarded capacitance probe of FIG. 3, taken substantially in the direction of the arrows 5—5 in FIG. 4.

FIG. 7 is a schematic diagram of a third embodiment of a continuous level measurement system of the present invention, having an isolated guarded capacitance probe directly connected to the capacitance measurement circuit.

FIG. 8 is a schematic diagram of a fourth embodiment of a continuous level measurement system of the present invention, having an isolated capacitance probe and an isolated capacitance measurement circuit.

DESCRIPTION OF THE PREFERRED EMBODIMENTS

Figure 2:
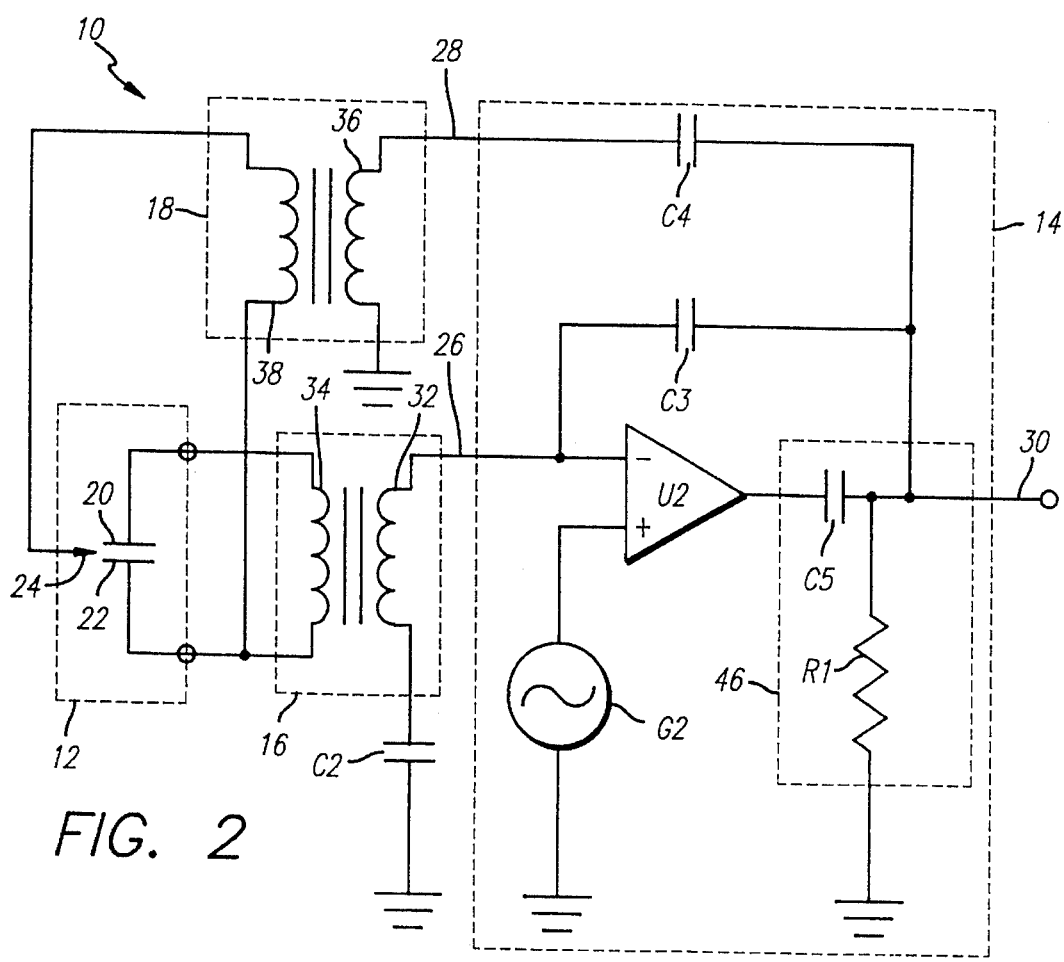
FIG. 2 is a schematic diagram of a first embodiment of a continuous level measurement system of the present invention, having an isolated guarded capacitance probe and a related isolated capacitance measurement circuit.

As shown in the exemplary drawings, and particularly in FIG. 2, the present invention is embodied in a continuous level measurement system 10 for use in determining the level of a liquid in a storage container. The level measurement system is shown having a guarded capacitance probe 12 coupled to a measurement circuit 14 via first and second isolation transformers 16 and 18, respectively. The capacitance probe has two insulated electrodes 20 and 22 and a guard element 24. The measurement circuit 14 has a drive signal terminal 26, a guard signal terminal 28, and an output signal terminal 30. The first isolation transformer is a 1:1 ratio pulse transformer having isolated primary and secondary windings, 32 and 34, respectively. Likewise, the second isolation transformer also is a 1:1 ratio pulse transformer having primary and secondary windings, 36 and 38, respectively.

The probe's electrodes 20 and 22 are connected to the secondary winding 34 of the first isolation transformer 16. The primary winding 32 of the first isolation transformer is connected between the drive terminal 26 and a blocking capacitor C2. The blocking capacitor is connected to a ground terminal, thus providing an ac path to ground while blocking any dc currents to ground. The primary winding 36 of the second pulse transformer 18 is connected between the ground terminal and the guard terminal 28. The second pulse transformer's secondary winding 38 has one terminal connected to the guard element 24 and its other terminal connected to the terminal of the first pulse transformer's secondary winding 34 that is connected to the probe's second electrode 22. The isolation transformers 16 and 18 provide excellent dc isolation and effectively eliminate the effects of common-mode ac noise currents induced on the probe's electrodes.

One embodiment of the guarded capacitance probe 12 is shown in more detail in FIGS. 3–5. The probe includes two electrodes 20 and 22, each constructed of a half-tube section. The two half-tube sections are separated from each other by an insulated 22-gauge wire 24 that extends down one side of the probe, between the two half-tube sections, and returns on the probe's opposite side. Preferably, the probe has a low dielectric plastic center core 40 (FIGS. 3 and 5) and a Teflon outside covering 42 for electrical isolation from the liquid. The lower, "submerged" end of the probe has a hermetic plug 44. Preferably, the probe is about ½ inch in diameter and can have a length of up to 12 feet or more.

With reference again to FIG. 2, the measurement circuit 14 excites the probe 12 with a 1 MHz signal, which is produced at the drive terminal 26 and supplied to the probe through the secondary winding 34 of the first isolation transformer 16. Under ideal conditions, the current between the probe's electrodes 20 and 22 varies with the capacitance between the electrodes. Since the probe is sealed, no liquid enters the space between the electrodes and any change in the probe's capacitances is due to the liquid level and the liquid's effect on the electric field outside of the probe. The greatest concentration of the electric field tends to be at the site where the two half-tube sections come together. Therefore, any material that coats the probe, even a thin coating, can affect the probe's performance, because the coating occurs where the electric field concentration is greatest.

As mentioned above, a coating on the probe's surface of a highly viscous and ionic liquid can cause inaccurate level readings. This coating effect can be reduced by exciting the guard wire 24 with a guard signal, provided by the measurement circuit at the guard terminal 28, which is 180° out of phase with the probe's excitation signal. The guard signal alters the distribution of the electric field near the junctions on each side of the probe, where the two half-tube sections 20 and 22 are joined together, and thereby reduces the coating effect.

The measurement circuit 14 (FIG. 2) includes an oscillator G2, an amplifier U2, a 60-Hz filter 46, a feedback capacitor C3, and a guard capacitor C4. The amplifier U2 is preferably an electrometer-type reactance operational amplifier. The oscillator G2 is connected between the operational amplifier's noninverting input terminal (+) and the ground terminal, and it produces an ac excitation signal Vs having a preferred frequency of about 1 MHz. The measurement circuit's drive terminal 26 is connected to the operational amplifier's inverting terminal (−). The 60-Hz filter 46 is merely a series combination of a capacitor C5 and a resistor R1, connected to the operational amplifier's output terminal to form a high-pass filter. The high-pass filter has a cutoff frequency above 60 Hz that allows the filter to remove 60-Hz power-line frequency noise from the operational amplifier's output signal. The node between the capacitor and the resistor is connected to the measurement circuit's output terminal 30. The feedback capacitor C3 is connected between the output terminal 30 and the drive terminal which, as discussed above, provides the excitation signal Vs to the probe. The feedback capacitor preferably is sized to have a capacitance on the same order of magnitude as the probe's capacitance. The guard capacitor C4 is connected between the output terminal 30 and the guard signal terminal, to provide the measurement circuit's output signal Vo to the guard wire, while blocking dc currents from the output terminal 30 to ground.

Accordingly, the capacitance probe 12 shown in FIG. 2 is isolated from any ground reference by the isolation transformers 16 and 18. Therefore, no noise currents that are induced on the probe are transferred to the measurement circuit 14. In addition, the probe's guard wire 24 also is isolated from any ground reference and, when driven by the output voltage signal Vo, it reduces coating effects on the probe without adversely affecting the probe's linearity.

Figure 6:
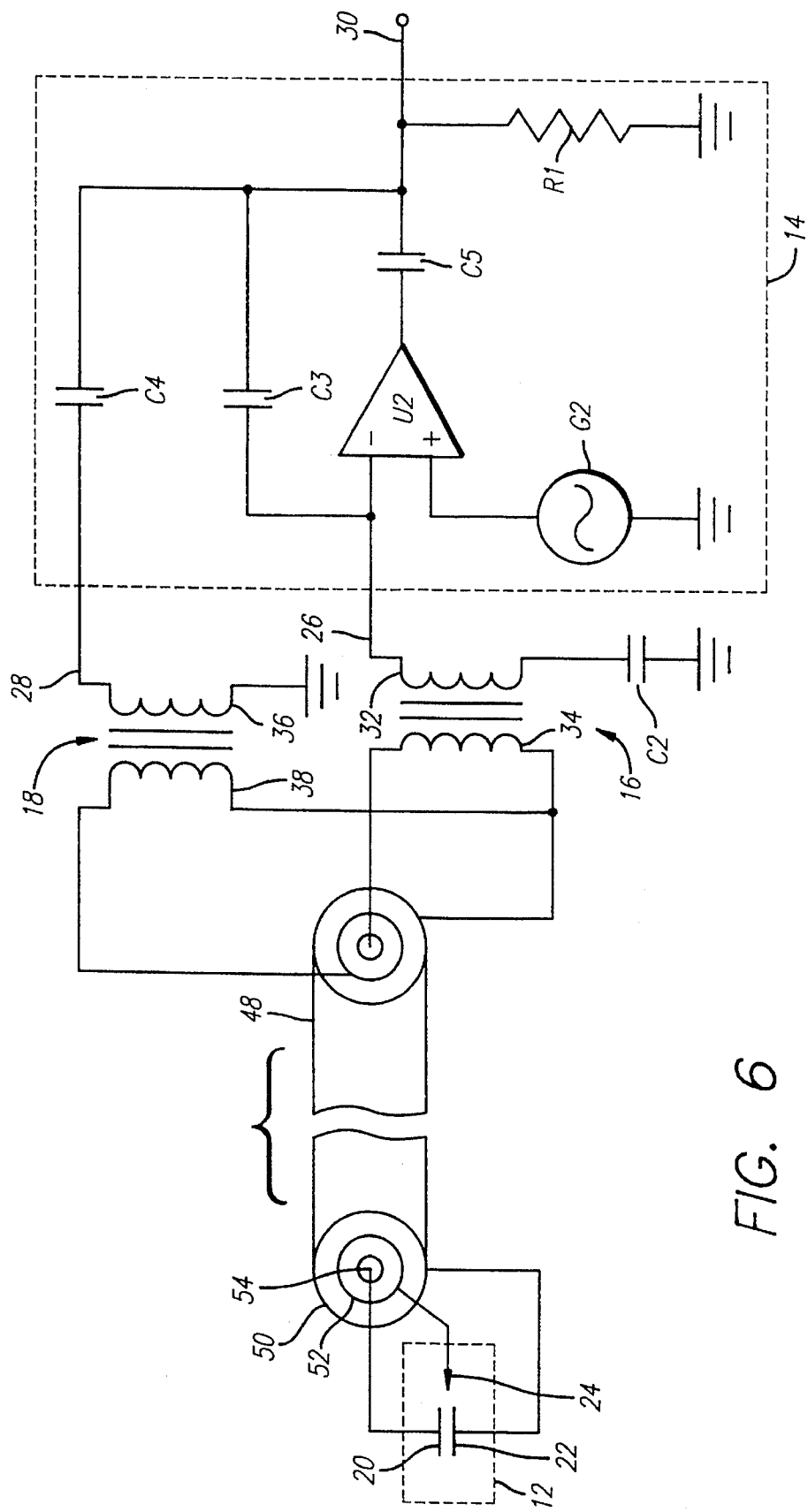
FIG. 6 is a schematic diagram of a second embodiment of a continuous level measurement system of the present invention, with the capacitance measurement circuit located remote from the isolated guarded capacitance probe and connected to it via a triaxial cable.

As shown in FIG. 6, the capacitance probe 12 can be located a relatively large distance from the measurement circuit 14, and it can be connected to the circuit by a triaxial cable 48. The triaxial cable includes an outer shield 50, an inner shield 52, and a center conductor 54. At the remote end of the triaxial cable, the first probe electrode 20 is connected to the center conductor, the second probe electrode 22 is connected to the outer shield, and the guard wire 24 is connected to the inner shield. At the adjacent end of the triaxial cable, the isolation transformers 16 and 18 are connected to the coaxial cable so that the 180° phase relationship between the guard signal and the drive signal, discussed above with respect to FIG. 2, are retained. Note, however, that for very long cables, a buffer amplifier (not shown) might be needed to drive the guard signal at the guard terminal 28.

If induced ground currents are not a concern, the isolation transformers 16 and 18 and the 60-Hz filter 46 can be eliminated, as shown in FIG. 7. In this embodiment, the guard wire 24 of the capacitance probe 12 is coupled directly to the measurement circuit's output terminal 30 through the guard capacitor C4, and the probe's electrodes 20 and 22 are connected directly to the operational amplifier's inverting input terminal and the ground terminal, respectively. As a result, noise currents can be induced on the capacitance probe and can affect the level measurement. Nevertheless, the guard wire still reduces the coating effect, thereby improving the probe's accuracy and reliability. Note that the probe can be remotely located from the measurement circuit using the triaxial cable 48 discussed above.

Figure 1:
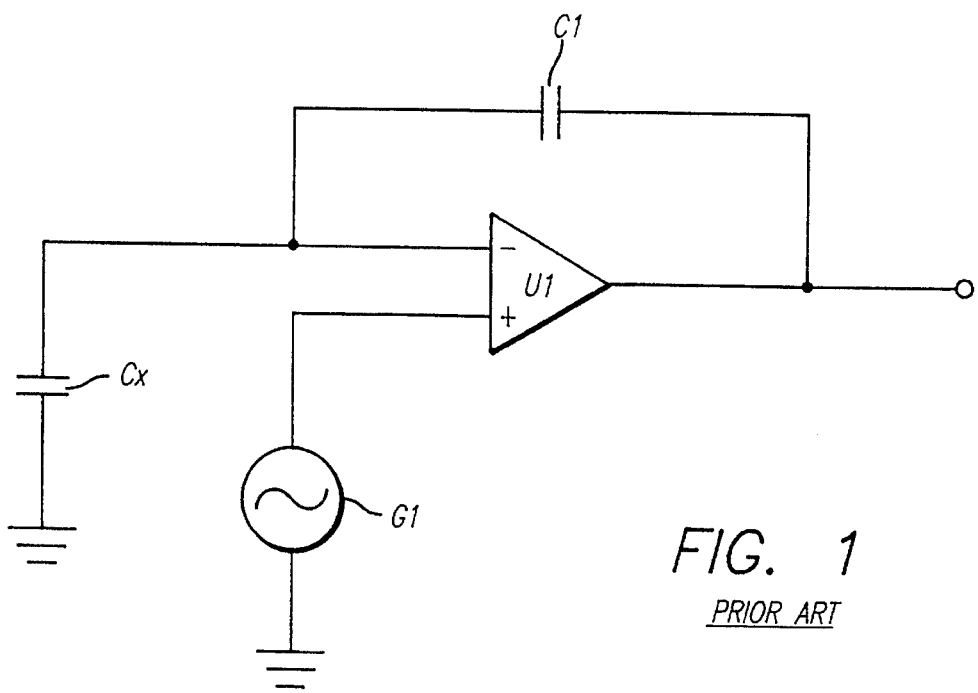
FIG. 1 is a schematic diagram of a prior art capacitance measurement circuit.

If the coating effect is not a concern, an alternative embodiment of a measurement system 10' in accordance with the present invention, shown in FIG. 8, may be used. This measurement system is similar to the measurement system 10 shown in FIG. 1, except that it eliminates the guard wire and its associated guard capacitor and isolation transformer. In this embodiment, any dc or common-mode ac noise with respect to the ground reference that is induced on the capacitance probe 12' is not passed on to the measurement circuit 14', since the isolation transformer totally isolates the probe from the ground reference.

From the above discussion, it can be seen that the measurement system 10 provides a rugged guarded capacitance probe and an isolated measurement circuit for driving the probe. The probe includes an insulated guard element that reduces coating effects on the probe caused by highly ionic liquids. The isolated measurement circuit includes at least one isolation transformer that allows the probe to be used, without any deterioration of performance, in any type of metal or nonmetallic tank, without considering whether the tank or the liquid therein, is electrically grounded. Accordingly, the system provides a versatile probe that can accurately determine the level of a variety of substances, including ionic and highly viscous fluids, without reference to any external ground.

Although the foregoing discloses the presently preferred embodiments of the present invention, it is understood that those skilled in the art may make various changes to the preferred embodiments shown without departing from the scope of the invention. The invention is defined only by the following claims.

I claim:

1. A capacitance probe for continuously sensing a fluid's level within a container over a predetermined height range, comprising:

first and second spaced-apart insulated electrodes located within the container, each electrode having a capacitive area of a predetermined length and width such that the length of each electrode extends over the predetermined height range, to allow continuous sensing of the fluid's level; and an insulated guard conductor symmetrically located between the capacitive areas of the first and second electrodes, for modifying an electric field surrounding the first and second electrodes.

2. A capacitance probe as defined in claim 1, wherein the first and second electrodes are first and second half-tube sections configured to form an elongated cylinder.

3. A capacitance probe for continuously sensing a fluid's level within a container over a predetermined height range, comprising:

first and second spaced-apart insulated electrodes located within the container, wherein the first and second electrodes are first and second half-tube sections configured to form an elongated cylinder, and each electrode has a capacitive area of a predetermined length and width such that the length of each electrode extends over the predetermined height range, to allow continuous sensing of the fluid's level; and an insulated guard element located between the first and second electrodes, for modifying an electric field surrounding the first and second electrodes, wherein the guard element is an insulated wire that extends along the length of one side of the elongated cylinder, between a first set of adjacent edges of the two half-tube sections, and that returns along an opposite side of the cylinder, between a second set of adjacent edges of the two half-tube sections.

4. A capacitance probe as defined in claim 3, further comprising:

a dielectric core of low density plastic that substantially fills the space between the two half-tube sections; and a covering that completely insulates the elongated cylinder from the fluid.

5. A capacitance probe for continuously sensing a fluid's level within a container over a predetermined height range, comprising;

first and second spaced-apart insulated electrodes located within the container, each electrode having a capacitive area of a predetermined length and width such that the length of each electrode extends over the predetermined height range, to allow continuous sensing of the fluid's level;

an insulated guard element located between the first and second electrodes, for modifying an electric field surrounding the first and second electrodes; and a capacitance measurement circuit having a first circuit terminal for providing an excitation signal with respect to ground, a second circuit terminal for providing a guard signal with respect to ground, and a third circuit terminal for providing an output signal with respect to ground, wherein the first circuit terminal is coupled to the first and second electrodes such that the excitation signal is applied across the first and second electrodes to induce an electric field between and surrounding the first and second electrodes, the second circuit terminal is coupled to the guard element such that the guard signal is applied to the guard element, and the output signal is based on the fluid's effect on the electric field.

6. A capacitance probe as defined in claim 5, wherein the capacitance measurement circuit further comprises:

an operational amplifier having an inverting input terminal, a noninverting input terminal, and an output terminal, wherein the inverting input terminal is coupled to the first circuit terminal and the amplifier's output terminal is coupled to the third circuit terminal;

an oscillator connected to the noninverting input of the operational amplifier;

a feedback capacitor connected between the operational amplifier's inverting input and the third circuit terminal; and a guard capacitor coupled between the second circuit terminal and the third circuit terminal.

7. A capacitance probe as defined in claim 6, wherein the capacitance measurement circuit further comprises a series-connected high-pass filter that has a filter capacitor and a filter resistor, wherein the filter capacitor is connected between the output terminal and the third circuit terminal, the filter resister is connected between the third circuit terminal and the ground terminal, and the high-pass filter has a cutoff frequency above 60 Hertz to remove power-line frequency noise from the output signal.

8. A capacitance probe as defined in claim 5, wherein the capacitance measurement circuit further comprises first and second isolation transformers, each transformer having isolated primary and secondary windings and each winding having first and second winding terminals, wherein the primary winding of the first isolation transformer is coupled between the first circuit terminal and a ground terminal, the secondary winding of the first isolation transformer has its first and second winding terminals coupled to the first and second electrodes, respectively, the primary winding of the second isolation transformer is connected between the second circuit terminal and the ground terminal, and the secondary winding of the second isolation transformer has its first winding terminal coupled to the guard element and its second winding terminal connected to the second secondary winding terminal of the first isolation transformer such that the excitation signal and the guard signal are 180° out of phase with each other.

9. A capacitance probe as defined in claim 8, further comprising a triaxial cable having an outer shield, an inner shield and a center conductor, wherein the outer shield is connected between the second electrode and the second secondary winding terminal of the isolation transformer, the inner shield is connected between the guard element and the first secondary winding terminal of the second isolation transformer, and the center conductor is connected between the first electrode and the first secondary winding terminal of the first isolation transformer.

10. A circuit for measuring the capacitance of a capacitance probe, comprising:

an excitation circuit having a drive terminal and an output terminal, wherein the excitation circuit provides an excitation signal with respect to ground at the drive terminal for exciting the capacitance probe, and further provides an output signal at the output terminal based on the capacitance probe's effect on the excitation signal; and a first isolation transformer having isolated primary and secondary windings, wherein the primary winding is coupled between the drive terminal and a ground terminal and the secondary winding is coupled across the capacitance probe, such that the capacitance probe is dc isolated from the drive terminal and the ground terminal.

11. A circuit for measuring the capacitance of a capacitance probe, comprising:

an excitation circuit having a drive terminal, an output terminal, an operational amplifier having an inverting input terminal, a noninverting input terminal, and an output terminal, wherein the inverting input terminal is coupled to the drive terminal and the operational amplifier's output terminal is coupled to the excitation circuit's output terminal, an oscillator connected to the noninverting input of the operational amplifier, and a feedback capacitor connected between the operational amplifier's inverting input terminal and the excitation circuit's output terminal;

wherein the excitation circuit provides an excitation signal with respect to ground at the drive terminal for exciting the capacitance probe, and further provides an output signal at the output terminal based on the capacitance probe's effect on the excitation signal; and a first isolation transformer having isolated primary and secondary windings, wherein the primary winding is coupled between the drive terminal and a ground terminal and the secondary winding is coupled across the capacitance probe.

12. A circuit as defined in claim 11, wherein:

the capacitance probe includes a guard element that improves the probe's accuracy; and the excitation circuit further includes a guard terminal coupled to the guard element, for providing a guard signal to the guard element.

13. A circuit as defined in claim 12, wherein the excitation circuit further includes a guard capacitor connected between the guard terminal and the excitation circuit's output terminal.

14. A circuit as defined in claim 13, wherein the excitation circuit further includes a high-pass filter connected between the amplifier's output terminal and the excitation circuit's output terminal, the high-pass filter having a cutoff frequency above 60 Hertz to remove power-line-frequency noise from the output signal.

15. A circuit as defined in claim 12, further comprising a second isolation transformer having isolated primary and secondary windings, wherein the primary winding of the second isolation transformer is connected between the guard terminal and the ground terminal and the secondary winding of the second isolation transformer is connected between the guard element and one side of the secondary winding of the first isolation transformer such that the excitation signal and the guard signal are 180° out of phase with each other.

16. A circuit as defined in claim 15, further comprising a triaxial cable having an outer shield, an inner shield, and a center conductor, wherein each secondary winding has first and second terminals with the outer shield connected between the second electrode and the second secondary winding terminal of the first isolation transformer, the inner shield connected between the guard element and the first secondary winding terminal of the second isolation transformer, and the center conductor connected between the first electrode and the first secondary winding terminal of the first isolation transformer.

17. A circuit as defined in claim 12, wherein:

the capacitance probe includes first and second spaced-apart insulated electrodes, each having a capacitive area of a predetermined length and width such that the length of each electrode extends over a predetermined height range, to allow continuous sensing of a fluid's level within a container; and the guard element is insulated and located between the first and second electrodes, to modify an electric field surrounding both the first and second electrodes.

18. A circuit as defined in claim 17, wherein:

the first and second electrodes are first and second elongated half-tube sections configured to form an elongated cylinder; and the guard element is an insulated wire that extends along the length of one side of the probe cylinder between a first set of adjacent edges of the two half-tube sections, and that returns on an opposite side of the probe cylinder between a second set of adjacent edges of the two half-tube sections.

19. A circuit as defined in claim 18, wherein the capacitance probe further includes a covering that completely insulates the probe from the liquid.

20. A fluid level measurement system for continuously sensing a fluid's level over a predetermined height range, comprising:

first and second spaced-apart insulated half-tube section electrodes spaced apart and configured to form an elongated cylindrical capacitance probe, each electrode having a capacitive area of a predetermined length and width such that the length of each electrode extends over the predetermined range to allow continuous sensing of the fluid's level;

an insulated guard element located between the electrodes such that the guard element extends along the length of one side of the probe between a first set of adjacent edges of the two half-tube section electrodes, and that returns on an opposite side of the probe between a second set of adjacent edges of the two half-tube sections, to modify an electric field surrounding the first and second electrodes;

a capacitance measurement circuit having a drive terminal for providing an excitation signal with respect to ground, a guard terminal for providing a guard signal with respect to ground, and a output terminal for providing an output signal with respect to ground based on the probe's response to the excitation signal; and a first and second isolation transformers, each transformer having isolated primary and secondary windings and each winding having first and second winding terminals, wherein the primary winding of the first isolation transformer is coupled between the drive terminal and a ground terminal, the secondary winding of the first isolation transformer has its first and second winding terminals coupled to the first and second electrodes, respectively, the primary winding of the second isolation transformer is connected between the guard terminal and the ground terminal, and the secondary winding of the second isolation transformer has its first winding terminal coupled to the guard element and its second winding terminal connected to the second secondary winding terminal of the first isolation transformer such that the excitation signal and the guard signal are 180° out of phase with each other.

\* \* \* \* \*